(12) United States Patent
Fang

(10) Patent No.: US 8,798,581 B2
(45) Date of Patent: Aug. 5, 2014

(54) TERMINAL AND METHOD FOR BINDING SIM CARD

(75) Inventor: Lijun Fang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/520,010

(22) PCT Filed: Jul. 27, 2010

(86) PCT No.: PCT/CN2010/075490
§ 371 (c)(1),
(2), (4) Date: Jun. 29, 2012

(87) PCT Pub. No.: WO2011/091658
PCT Pub. Date: Aug. 4, 2011

(65) Prior Publication Data
US 2012/0282901 A1 Nov. 8, 2012

(30) Foreign Application Priority Data

Jan. 28, 2010 (CN) .......................... 2010 1 0104519

(51) Int. Cl.
*H04M 1/66* (2006.01)
*H04W 12/06* (2009.01)
*H04W 8/18* (2009.01)

(52) U.S. Cl.
CPC .............. *H04W 12/06* (2013.01); *H04W 8/183* (2013.01)
USPC ..... 455/411; 455/410; 455/412.1; 455/414.1; 455/418

(58) Field of Classification Search
USPC .................... 455/411, 410, 412.1, 414.1, 418
See application file for complete search history.

(56) References Cited

U.S. PATENT DOCUMENTS 6,445,914 B1 9/2002 Findikli et al.
2007/0207798 A1* 9/2007 Talozi et al. .................. 455/423
(Continued)

FOREIGN PATENT DOCUMENTS

CN 101018226 A 8/2007
CN 101141718 A 3/2008
(Continued)

OTHER PUBLICATIONS

International Search Report for PCT/CN2010/075490 dated Oct. 10, 2010.

(Continued)

*Primary Examiner* — Shahriar Behnamian
(74) *Attorney, Agent, or Firm* — Ling Wu; Stephen Yang; Ling and Yang Intellectual Property

(57) ABSTRACT

A terminal and a method for binding Subscriber Identification Module (SIM) cards are provided. During an initialization of a SIM card, the terminal sends a terminal profile command to inform related items of a SIM Tool Kit (STK) supported by the SIM card. The SIM card provides the SIM card related operator information to the terminal by actively reporting a proactive command or providing menu items. The terminal judges whether the SIM card operator information of the STK function matches with the SIM card operator information stored in the terminal or not, if they match, the terminal allows the user to normally use the terminal; otherwise or the STK function does not provide the SIM card related operator information, the terminal does not allow the user to normally use the terminal. Therefore, the purpose of locking cards by the terminal is realized with the STK function of the SIM card.

2 Claims, 2 Drawing Sheets

(56) References Cited

U.S. PATENT DOCUMENTS

2008/0090568 A1* 4/2008 Venkateswarlu .......... 455/432.1
2009/0253410 A1* 10/2009 Fitzgerald et al. ............ 455/411

FOREIGN PATENT DOCUMENTS

| CN | 101616401 A | 12/2009 | | |
|---|---|---|---|---|
| DE | 10128948 A1 | 1/2003 | | |
| JP | 2007267006 A | 10/2007 | | |
| JP | 2008066984 A | 3/2008 | | |
| JP | 2009065282 A | 3/2009 | | |
| WO | 9857511 A1 | 12/1998 | | |
| WO | WO 00/18156 | * 3/2000 | ............... | H04Q 7/22 |
| WO | WO0018156 | * 3/2000 | ............... | H04Q 7/22 |

OTHER PUBLICATIONS

"The GSM System"; Wolfgang Rankl et al.; Smart Card Handbook; Dec. 1, 2003, John Wiley & Sons, XP055017691A; see pp. 735-789.

* cited by examiner

TERMINAL AND METHOD FOR BINDING SIM CARD

TECHNICAL FIELD

The present invention relates to the field of wireless communication technologies, and more specifically, to a terminal and a method for binding SIM cards.

BACKGROUND OF THE RELATED ART

With the mature development and popularity of 3G technologies, the competition between the operators becomes more and more intense. The sales of mobile terminal equipments more and more use the operator customization, and wherein, a function for locking a card is one of very important customization methods. A mobile phone with the function of locking a card can only use one or more subscriber identification module (SIM) cards customized by the operators, while the other SIM cards cannot be used normally when inserted in this model of the mobile phone terminal.

With the locking card function, the users can only be guaranteed to use the SIM cards of specific operators in order to protect the benefits of the operators. Most of the current locking card technologies bind a SIM card by using the mobile country code (MCC) as well as mobile network code (MNC) of the International Mobile Subscriber Identification Number (IMSI) of the SIM card, or by storing the IMSI number of the SIM card into the mobile phone. The first method cannot accurately distinguish several types of SIM cards from an identical operator, since the MCCs and MNCs of these SIM cards are the same. The drawback of the second method is that the number of IMSI numbers stored in the mobile phone is limited, so as the number of the locked SIM cards. Given the limitations of the above two methods, there are requirements on binding different types of the SIM cards from the identical operator, and there should be no limitation on the number of the SIM cards to be bound.

The SIM Tool Kit (STK) function contains a set of commands for the terminal and the SIM card to interact with each other, so that the SIM card can be used to run an application program in the card so as to achieve value-added services. Herein, the set of commands are two types of commands of the STK function, one type is an envelope command that is sent by the terminal to the SIM card, the other type is the proactive command that is actively sent by SIM card to the terminal. The SIM card and the terminal interact with each other by these two types of commands. The STK functions, that is the value-added services, of different operators are not the same, and the STK functions, that is value-added services, of different types of SIM cards from the identical operator are not the same either, which makes locking a SIM card with the STK function of the SIM card possible.

SUMMARY OF THE INVENTION

The purpose of the present invention is to provide a terminal and method for binding subscriber identification module (SIM) cards.

To achieve the aforementioned purpose, the present invention provides a method for binding subscriber identification module (SIM) cards, comprising:

a terminal judging whether SIM card operator information provided by a SIM Tool Kit (STK) matches with the SIM card operator information stored in the terminal or not, if they match, allowing the user to normally use the terminal; otherwise, not allowing the user to normally use the terminal.

Before this step, the method also comprises:

during the initialization of the SIM card, the terminal sending a terminal profile command to inform related items of the STK supported by the SIM card, the SIM card providing the SIM card related operator information to the terminal by actively reporting a proactive command report or providing menu items.

Before the terminal judges the matching and after the terminal sends the terminal profile command, the method also comprises:

the terminal judging whether the SIM card operator related information provided by the STK is received or not after sending the terminal profile command, if the information is received, performing a judgment; otherwise, the terminal determining that the SIM card is not the one bound with it, and not allowing the user to perform normal operations.

Said matching is that: the operator information provided in the STK function is consistent with the operator information stored in the terminal, and now the SIM card is a SIM card bound with the terminal;

said not matching comprises that the STK function does not provide the SIM card related operator information, the SIM card related operator information provided in the STK function is inconsistent with the operator information stored in the terminal, now the SIM card is not the one bound with the terminal.

A terminal for binding SIM cards, said terminal comprises a terminal profile sending module, and a STK content judgment and control module; wherein the SIM card used by the data card comprises a SIM card STK module, wherein, the terminal profile sending module is used to send a terminal profile command to the SIM card;

the SIM card STK module is used to receive the terminal profile command, and send the SIM card STK content to the data card;

the STK content judgment and control module is used to judge whether the SIM card operator information acquired from the STK function of the SIM card matches with the SIM card operator information stored in the terminal or not, if yes, allow the user to normally use the terminal; otherwise or the STK function does not provide the SIM card related operator information, not allow the user to normally use the terminal.

In summary, compared with the prior art, a method for binding the SIM card, in which the terminal compares the SIM card operator information provided by the SIM card via STK with the SIM card operator information stored in the terminal, is used in the technical solution of the present invention, and the method is significantly different from the conventional method in which the card is locked via the IMSI file of the SIM card, so as to bind different types of SIM cards from the identical operator distinctively, and the number of locked SIM cards is no limited.

PREFERRED EMBODIMENTS OF THE PRESENT INVENTION

The present invention provides a method and terminal for binding SIM cards with the STK functions of the SIM cards.

The principle of the technical scheme of the present invention is: during an initialization of a SIM card, the terminal sends a terminal profile command to inform the related items of the STK supported by the SIM card, the SIM card provides the SIM card related operator information to the terminal by actively reporting the proactive command report or providing the menu items, the terminal judges whether the SIM card operator information in the STK function matches with the SIM card operator information stored in the terminal or not, if yes, it allows the user to normally use the terminal; otherwise or the STK function does not provide the SIM card related operator information, the terminal does not allow the user to normally use the terminal. Therefore, the STK function of the SIM card can be used to achieve the purpose of locking the card by the terminal.

The method for the terminal, used in the present invention, binding the SIM cards by comparing the SIM card operator information provided by the STK with the SIM card operator information stored in the terminal is significantly different from the method for binding the SIM cards, and the distinctively binding different types of SIM cards of the identical operator are realized, moreover, the number of locked SIM cards is no limited.

In the following, the technical scheme of the present invention will be described in combination with the specific embodiments and the accompanying drawings.

Figure 1:
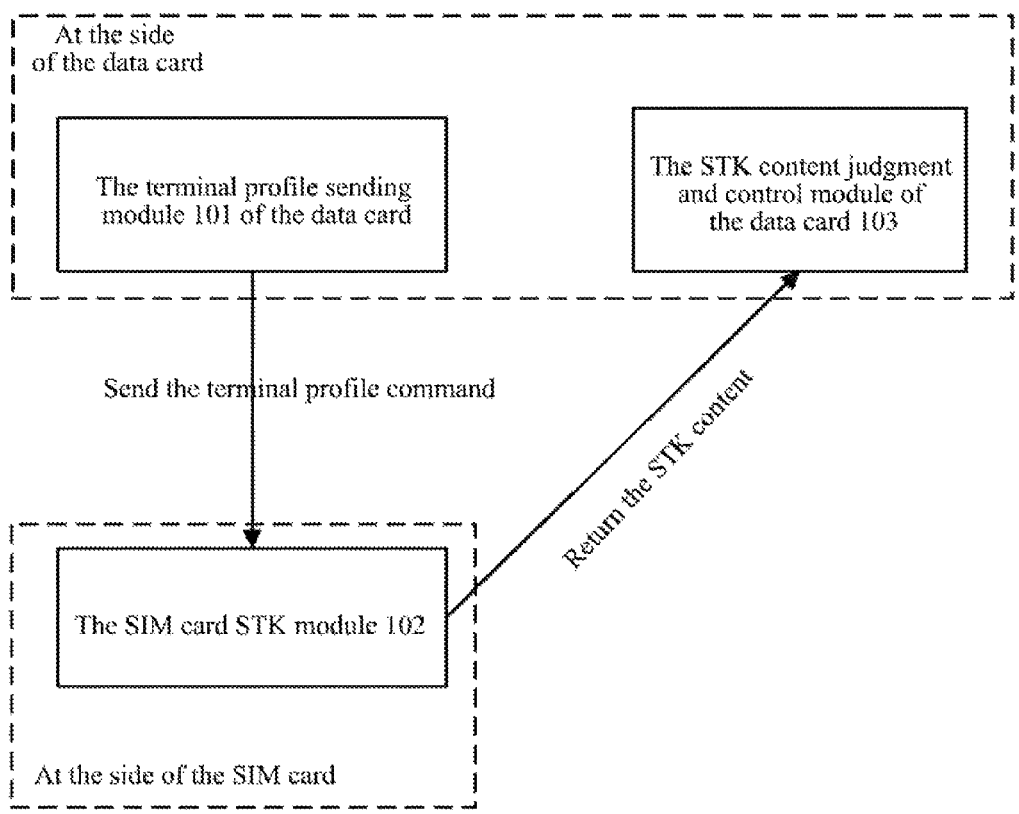
FIG. 1 is a schematic diagram of an embodiment of the terminal for binding SIM cards in accordance with the present invention.

FIG. 1 is a schematic diagram of an embodiment of the terminal for binding the SIM cards in accordance with the present invention, in this embodiment, the terminal is described by taking a data card for example. The data card in this embodiment comprises a terminal profile sending module 101 of the data card, as well as an STK content judgment and control module 103 of the data card; the SIM card used by the data card comprises a SIM card STK module 102, wherein:

the terminal profile sending module 101 of the data card is used to send a terminal profile command to the SIM card;

the SIM card STK module 102 is used to receive the terminal profile command and send the SIM card STK content to the data card;

the STK content judgment and control module 103 of the data card is used to judge whether the SIM card operator information acquired from the STK function of the SIM card matches with the SIM card operator information stored in the terminal or not, if they match, allow the user to normally use the terminal; otherwise or the STK function does not provide the SIM card related operator information, not allow the user to normally use the terminal.

Figure 2:
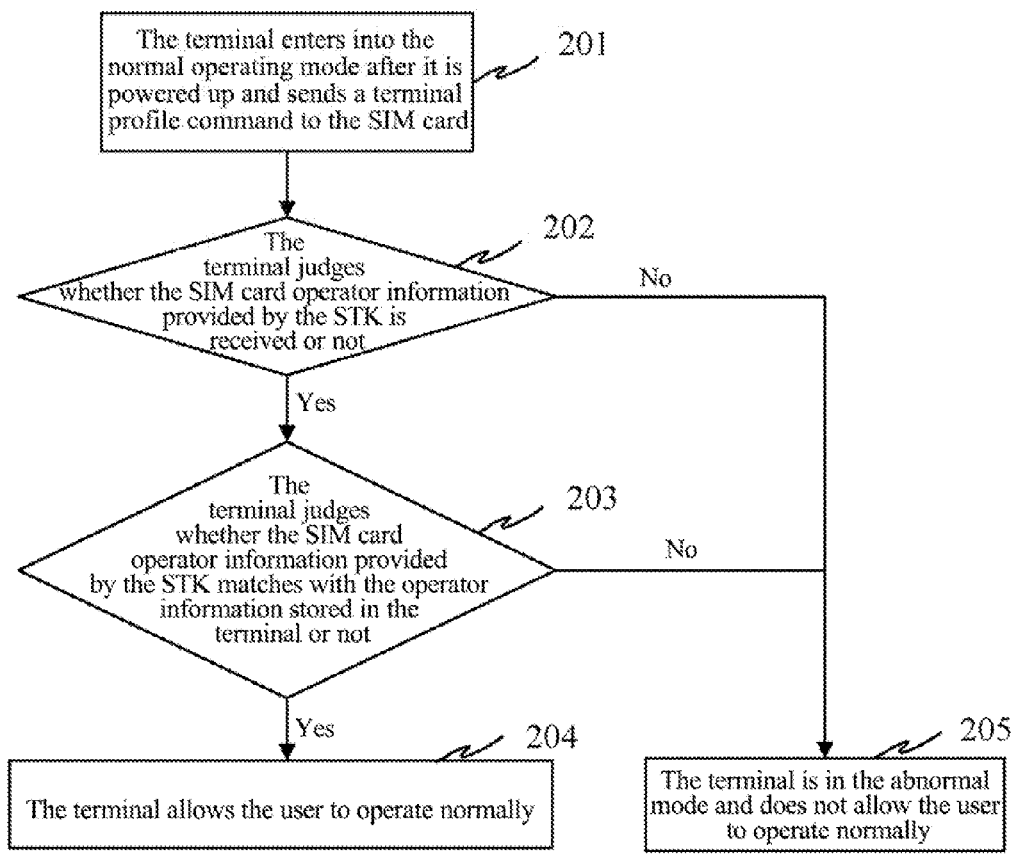
FIG. 2 is a flow diagram of an embodiment of the method for binding SIM cards in accordance with the present invention.

FIG. 2 is a flow chart of an embodiment of the method for binding the SIM cards in accordance with the present invention, in this embodiment, the process of the terminal initializing a SIM card and subsequently binding the SIM card comprises the following steps:

step 201: the terminal enters into the normal operating mode after it is powered up and sends a terminal profile command to the SIM card.

Step 202: the terminal judges whether the SIM card operator information provided by the STK is received or not after sending the terminal profile command, if yes, it is to proceed to step 203; otherwise, it is to proceed to step 205.

Step 203: The terminal judges whether the SIM card STK operator information matches with the operator information stored in the terminal or not, if yes, it is to proceed to step 204; otherwise, it is to proceed to step 205.

It should be noted that, the matching here means that the operator information provided in the STK function is consistent with the operator information stored in the terminal; not matching means that the STK function does not provide the SIM card related operator information, or the SIM card related operator information provided in the STK function is inconsistent with the operator information stored in the terminal.

Step 204: The terminal determines that the SIM card is the one bound with it and allows the user to operate normally. End this process.

Step 205: The terminal determines that the SIM card is not the one bound with it, and does not allow the user to operate normally.

The new method for a terminal binding the SIM cards and the terminal thereof are provided in the technical scheme of the present invention, with the method, the terminal binds the SIM cards via the STK functions of the SIM cards. The method of the present invention is significantly different from the conventional method in which the cards are locked via the IMSI file, and distinguishingly binding different types of SIM cards from the identical operator is realized, moreover, there is no limit in the number of the locked SIM cards.

Of course, the present invention might have a variety of embodiments, without departing from the spirit and principles of the present invention, those skilled in the art can make different kinds of corresponding modifications or replacements, and all the modifications, equivalent replacements and improvements made within the spirit and principles of the present invention should be included within the protection scope of the present invention.

What is claimed is:

1. A method for a terminal binding subscriber identification module (SIM) cards, comprising:

during an initialization of a SIM card, the terminal sending a terminal profile command to the SIM card to inform the SIM card the relevant SIM Tool Kit (STK) items that are supported by the terminal;

after the STK of the SIM card is informed of the terminal supporting a proactive command, the STK of the SIM card issuing a proactive command to the terminal; and the terminal, after receiving the proactive command, judging whether operator information of the SIM card is provided by the STK of the SIM card;

when the operator information of the SIM card is not provided by the STK of the SIM card, the terminal determining that the SIM card is not the one bound with the terminal, and not allowing the user to use the terminal with the SIM card, when the operator information of the SIM card is provided by the STK of the SIM card, the terminal judging whether the operator information of the SIM card provided by the STK of the SIM card is consistent with the operator information of the SIM card supported by the terminal and stored in the terminal;

when they are consistent, allowing a user to normally use the terminal with the SIM card; when they are not consistent, not allowing the user to use the terminal with the SIM card.

2. A terminal for binding subscriber identification module (SIM) cards, comprising a terminal profile sending module, and a SIM Tool Kit (STK) content judgment and control module; wherein a SIM card used by the terminal comprises a SIM card STK module, wherein, the terminal profile sending module is used to send a terminal profile command to the SIM card to inform relevant STK items that are supported by the terminal;

the SIM card STK module is used to, after being informed of the terminal supporting a proactive command, issue a proactive command to the terminal;

the STK content judgment and control module is used to, after receiving the proactive command, judge whether operator information of the SIM card is provided in the proactive command or the menu items, when the operator information of the SIM card is not provided, determine that the SIM card is not the one bound with the terminal and not allow the user to use the terminal with the SIM card;

when the operator information of the SIM card is provided, judge whether the operator information of the SIM card is consistent with the operator information of the SIM card supported by the terminal and stored in the terminal, when they are consistent, allow a user to normally use the terminal with the SIM card; when they are not consistent, not allow the user to use the terminal with the SIM card.

* * * * *